Dec. 24, 1940.   W. A. NEWTON, JR., ET AL   2,226,135
CORD STRETCHING AND WINDING MACHINE
Filed Jan. 19, 1939   3 Sheets-Sheet 3

INVENTORS
WILLIAM A. NEWTON, Jr.
DENNIS T. AUSTIN, Jr.
BY Gourley + Budlong
ATTORNEYS Patented Dec. 24, 1940

2,226,135

UNITED STATES PATENT OFFICE 2,226,135

CORD STRETCHING AND WINDING MACHINE

William A. Newton, Jr., Winnsboro, S. C., and Dennis T. Austin, Jr., Hogansville, Ga., assignors to United States Rubber Company, New York, N. Y., a corporation of New Jersey Application January 19, 1939, Serial No. 251,712

13 Claims. (Cl. 28—57)

This invention relates to a cord winding machine having associated therewith stretching mechanism for removing a certain amount of stretch from the cord during the winding operation, and more particularly to novel mechanism for stopping the winding operation before the cord has become entirely exhausted from the supply package.

It is found that certain improved properties are imparted to a tire cord by permanently stretching, attenuating or elongating the cord to thereby reduce its size and increase its compactness. In the Louis M. Cotchett application Serial No. 201,903 filed April 14, 1938, now Patent 2,185,245, for a cord stretching and winding machine there is shown described and claimed mechanism for removing a certain amount of stretch from the cord during the winding operation, and the present invention is directed to improvements in a cord stretching and winding machine of the general type disclosed in said Cotchett application.

Winding machines for winding cord from small to large packages have been in extensive use for many years and cord stretching or advancing devices consisting of positively driven rolls have been employed heretofore, but when positively driven advancing rolls are employed in connection with a winding machine, the problem is always presented of properly correlating the speed at which these rolls are driven with respect to the speed of the cord take-up mechanism. By employing free-running stretching rolls adapted to be operated solely by the advancing pull exerted upon the cord, as herein contemplated, a very simple and satisfactory construction is secured.

The cord stretching device herein contemplated is located between the let-off and take-up packages and consists of a pair of spaced tapered rolls about which the cord is wrapped in a number of adjacent runs. In threading up the present machine for operation the cord is wound by hand around these stretching rolls. It is therefore important that the winding machine be provided with stopping mechanism for stopping the winding operation as the cord upon the let-off packages approaches exhaustion so that the machine will be brought to rest before the cord on the supply package is entirely exhausted, and thereby avoid the necessity of threading up the machine each time the cord supply package needs to be replenished. Such stopping mechanism in order to operate satisfactorily on a high speed machine should serve to bring the operating parts to rest quickly from a high speed, and since the cord which remains on the let-off package when the winding operation is stopped is discarded as waste, the amount of the same should be as small as can be secured and at the same time effect such stoppage before the cord becomes entirely exhausted upon the supply package.

One important feature of the present invention therefore resides in a cord let-off spool having a cord bunch wound thereupon in a predetermined position, and in means upon the winding machine adapted to cooperate with this bunch to detect when near exhaustion thereof occurs and thereupon effect stoppage of the winding operation before complete exhaustion of the cord upon the supply package occurs. Such bunch detecting means, in the embodiment of the invention illustrated, comprising a brake adapted to press against the supply of cord on the let-off package to retard its rotation during the winding operation and to stop pressing upon such cord as substantial exhaustion of the bunch upon the package occurs.

Another feature of the present invention resides in brake means which remains inactive throughout the normal cord stretching and winding operation but becomes active to quickly stop the free running of the let-off spool as soon as stoppage of the winding operation is initiated.

A more specific feature of the present invention resides in knock-off mechanism which is adapted to be held in its inactive position by the normal tension of the cord extending between the let-off and take-up package, but is adapted to effect stoppage of the winding operation when the tension of this cord falls below a predetermined amount.

Still another feature of the invention resides in an auxiliary driving sheave located between the cord stretching device and the take-up package and adapted to exert a pulling action upon the cord to help supply the same to the take-up package, and still a further feature resides in means for operating the brake that presses against the cord upon said let-off package with gradually increasing pressure as the size of the package decreases to thereby maintain a substantially uniform tension upon the cord being withdrawn therefrom.

Other features of the invention and novel combination of parts in addition to the above will be hereinafter described in connection with accompanying drawings illustrating one good practical form thereof.

In the drawings:

Fig. 4 is a vertical sectional view through the supporting bearing for the let-off spindle and associated parts.

Fig. 5 is a side elevation illustrating the operation of the weighted lever for the presser pad; and Fig. 6 is a side elevation of a modification showing means for pressing the cord firmly against the auxiliary driving sheave.

Figure 1:
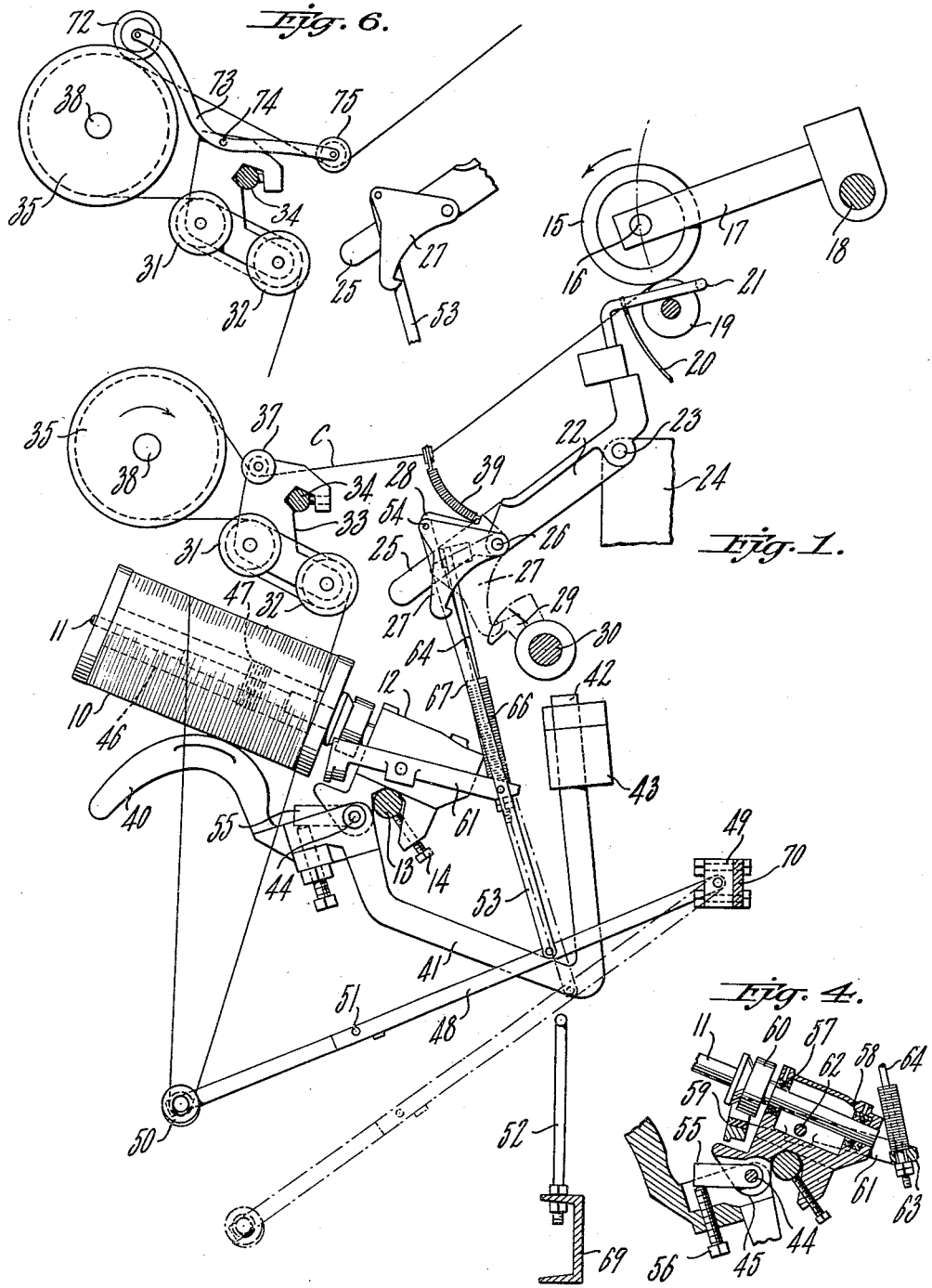
Fig. 1 is an end view with parts in section of portions of a cord winding machine constructed in accordance with the present invention, the parts being shown in the running position.

The mechanism of the present invention may be employed to impart a permanent elongation to cords formed of various textile materials, but the invention was developed more particularly for use in connection with cord winding machines to impart a permanent elongation to cotton tire cord during the operation of winding the cord from a let-off spool to a take-up shipping package. The stretching of the cord reduces its gauge and increases its tensile strength relative to its weight, this gives the cord a higher strength per unit of weight and thereby permits the construction of lighter tire fabrics.

In the embodiment of the invention illustrated, the cord C to be stretched and wound into a large shipping package is supplied by a spool or let-off package 10 which is mounted upon an inclined spindle 11 to rotate therewith. This spindle is rotatably mounted in the spindle supporting casing 12 which is shown as clamped upon the supporting rod 13 at the desired inclination by the set screw 14. The cord C after passing through various devices to be described is wound upon the cord take-up package or cone 15 which is rotatably mounted on a supporting spindle 16. This spindle is shown as secured at one end to a supporting arm 17, which is mounted for swinging movement about the supporting shaft 18. The arrangement is such that the package or cone 15 irrespective of its size may rest by gravity upon the power driven drum 19 to be operated thereby at a predetermined surface speed. The cord C is wound evenly upon this package by the traverse mechanism 20.

When it is desired to stop the rotation of the take-up package 15, this package is lifted off of the driving drum 19 by the package lifting brake-bar 21 which engages the surface of the package to frictionally arrest its rotation as it lifts the same. The brake-bar 21 is secured to and extends upwardly from a stop motion apron 22 which is pivotally mounted at 23 upon a fixed support 24. The arrangement is such that this apron may be manually operated by means of the handle 25 to raise or lower the package 15, or it may be automatically depressed by mechanism to be described to thereby stop the winding operation.

Figure 2:
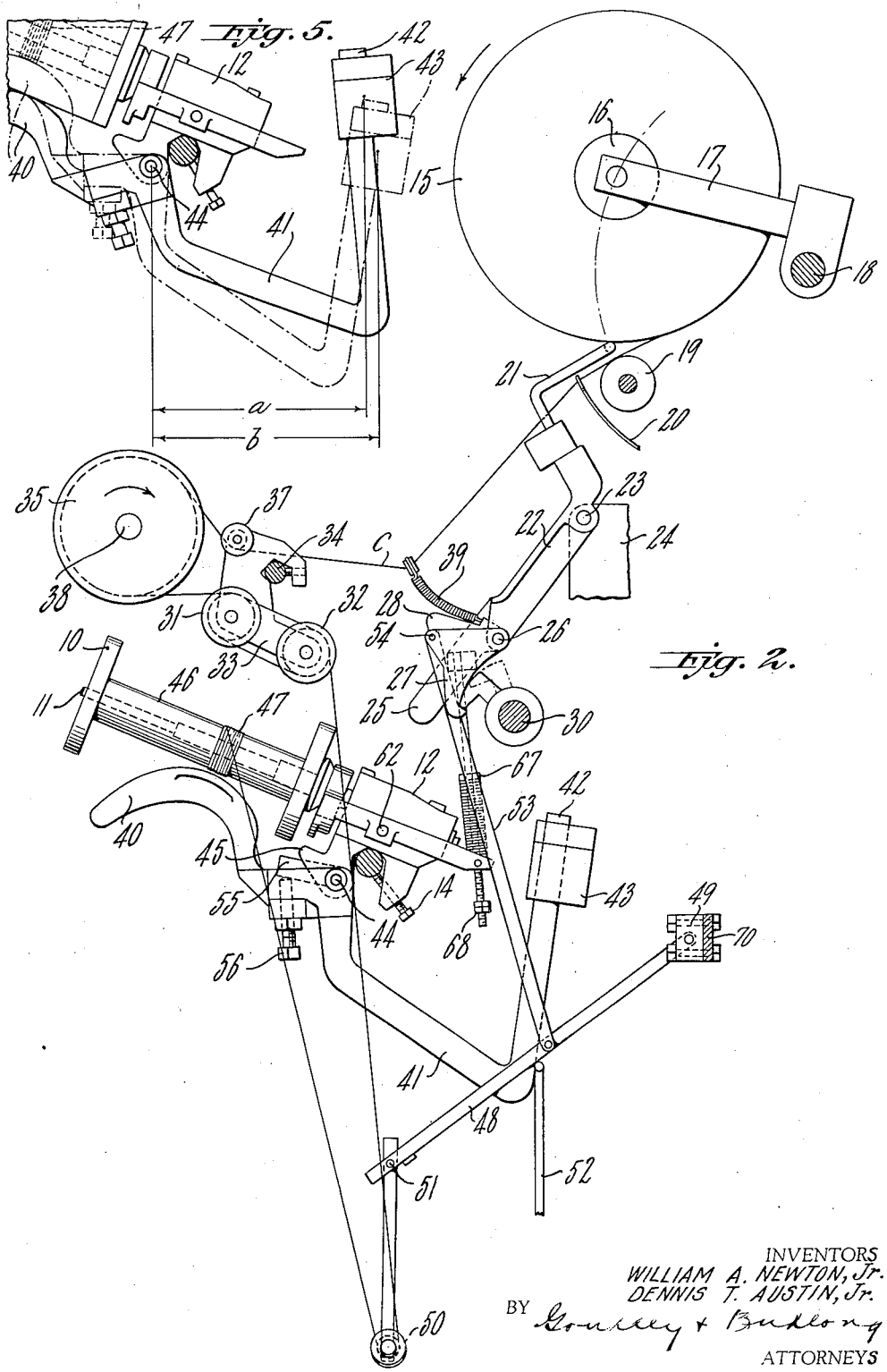
Fig. 2 is a similar view showing the position of the parts when the winding operation has been stopped by the stopping mechanism before the cord has become entirely exhausted from the supply package.

In order automatically to operate the stop motion apron 22 there is pivotally secured thereto at 26, two independently operable drop wire castings 27 and 28, each of which is provided with a hook at its lower end adapted to be engaged and pulled downwardly by an oscillating dog or knock-off device 29 which is secured to and is rocked back and forth by the oscillating shaft 30. The arrangement is such that the drop wire casting 27 is held by the tension of the cord C extending between the let-off spool 10 and stretching rolls, to be described, in the inactive position in which it is shown in Fig. 1 during the normal winding operation of the machine, and the other drop wire casting 28 is normally held in the inoperative position in which it is shown in Fig. 1 by the tension of the portion of the cord C approaching the take-up package 15. When the portion of the cord C between the let-off package 10 and stretching device becomes abnormally slack the first drop wire casting 27 will be moved downwardly by mechanism to be described into the dotted position in which it is shown in Fig. 1 to lie in the path of the oscillating dog 29, whereupon a downward pull will be exerted upon the hook of this casting to tilt the stop motion apron 22 downward to its machine stopping position in which it is shown in Fig. 2. This it will be noted actuates the brake bar 21 to lift the package 15 up off of the driving drum 19 and stop the rotation of this package.

The cord stretching apparatus herein contemplated is located between the let-off package 10 and take-up package 15 and is adapted to be operated solely by the advancing pull exerted upon the cord. This not only provides an extremely simple mechanism for imparting any desired amount of stretch to the cord but also makes it unnecessary to positively drive any part of the stretching mechanism. The stretching device employed preferably consists of a pair of free running tapered rolls which are mounted in spaced relation to each other so that the cord to be stretched may be wound around these rolls in a number of spaced runs. These rolls may be of the grooved type forming the subject matter of the Charles J. Killette application, Serial No. 141,952 filed May 11, 1937, or they may be grooveless rolls such as disclosed in the Louis M. Cotchett application Serial No. 228,906 filed September 8, 1938. In the construction of each of these applications the arrangement is such that as the cord travels about the spaced tapered rolls along the successive runs of slightly increasing length, the cord is subjected to a stretching operation which serves to permanently increase its length up to 5% or more.

The cord stretching device herein illustrated consists of the tapered grooved rolls 31 and 32 which are rotatably supported by the bracket 33 in spaced relation to each other. This bracket is shown as clamped by means of a set screw to a fixed rod 34.

Figure 3:
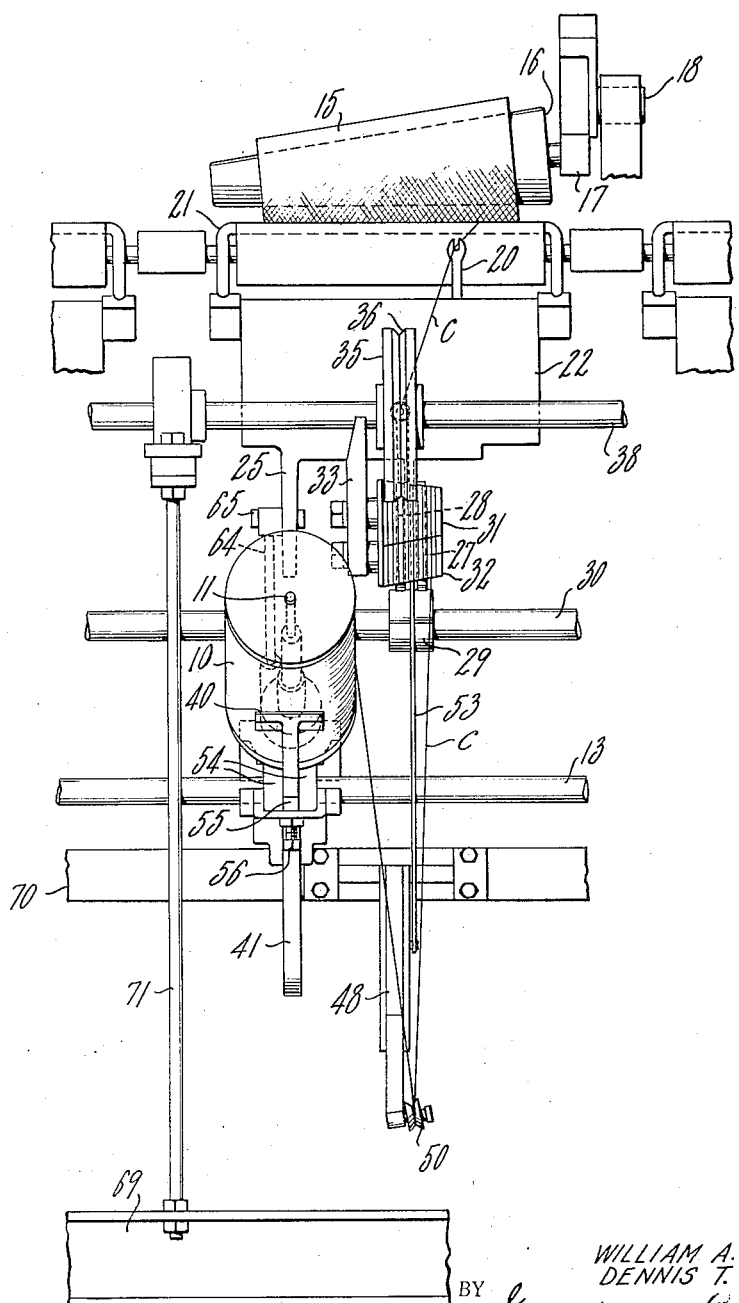
Fig. 3 is a front elevation of the machine showing the operating parts in the position in which they are illustrated in Fig. 1.

If desired the rotation of the take-up package 15 may be relied upon to pull the cord C forward from the let-off package 10 and through the cord stretching mechanism, but this causes the cord to be wound in relatively tight windings upon the take-up package. It may therefore be desirable to provide the auxiliary driving sheave or pulley 35 to help pull the cord through the stretching mechanism and advance it toward the take-up package. The pulley or sheave 35 is preferably provided with a cord receiving groove 36 as best shown in Fig. 3, and in the construction shown the cord is looped about this grooved sheave as it leaves the stretching device and then passes under the guide roll 37. This auxiliary driving sheave is rotatably supported by the shaft 38 and is positively driven by means not shown at a surface speed about 25% faster than the travel of the cord C. The arrangement is such that the frictional engagement of the cord with the sheave serves to exert a substantial pulling force upon the cord but not sufficient to pull the cord forward unless sufficient tension is maintained upon the cord C by the take-up package 15 to hold it in snug frictional engagement with this sheave.

The tension of the portion of the cord C extending from the auxiliary driving sheave 35 to the take-up package 15 also serves normally to hold the drop wire casting 28 in the inactive elevated position of Fig. 1. It will be noted that the coiled wire compensator 39 which is secured at one end to the dropped wire casting 28 is provided at its other end with a porcelain guide eye through which the cord C passes. When this cord breaks the casting 28 will drop into the path of the oscillating dog 29 to thereby stop the winding operation.

In order to impart uniform stretch to the cord C it is important to maintain substantially uniform tension upon that portion of the cord extending from the let-off package 10 to the cord stretching device, and novel mechanism to this end will now be described. In the first place it is found necessary or highly desirable to retard the rotation of the let-off package 10 as the cord is unwound therefrom, and one feature of the present invention therefore resides in a presser pad or brake 40 which in the construction shown is carried by a relatively long brake lever 41 that is provided at its opposite end with an upwardly extending arm 42 upon which are mounted the weights 43. This lever is pivotally mounted between its end by the pivot pin 44, and since it is important to prevent the lever from vibrating and to reduce side play to a minimum, this lever in the construction shown is provided adjacent the pivot point 44 with spaced sidewalls adapted to straddle and snugly embrace the downwardly extending projection 45 formed integrally upon the spindle supporting housing 12. The arrangement is such that the snug engagement between the spaced sidewalls of the lever 41 and the supporting projection 45 eliminates side play.

The let-off package 10 as herein illustrated comprises a spool which is adapted to fit tightly upon the supporting spindle 11 to rotate therewith and the body portion 46 of this spool in accordance with the present invention has a cord bunch 47 wound thereupon in a predetermined position, the arrangement is such that the cord forming this bunch will remain upon the spool after all of the rest of the cord has been unwound therefrom, and the purpose of this bunch is to facilitate the stopping of the winding operation after the cord has been removed from the rest of the spool and before this bunch is entirely exhausted. This facilitates the discarding of the few yards of cord that remains in the reduced bunch and which is usually inferior so that it is desirable to discard the same, and also makes it unnecessary to thread up the entire machine each time it is necessary to renew the supply package 10.

The weights 43 act to hold the brake or presser pad 40 in frictional contact with the surface of the let-off package 10 as the cord C is unwound therefrom. The arrangement is preferably such that the weights 43 will exert a pressure upon the package 10 which gradually increases as the size of the package decreases, to thereby maintain a substantially uniform tension on the cord pulled downwardly from this package. This may be secured by employing the construction best shown in Fig. 5 wherein it will be noted that the weights 43 are supported by the upwardly inclined arm 42 so that the center of gravity of these weights lies above the horizontal plane passing through the lever pivot 44 when the package 10 is full. As the size of this package decreases the weights 43 move downwardly and outwardly from the full line position towards the dotted line position to thereby increase the leverage for these weights from the distance $a$ to the distance $b$.

In order further to increase the uniformity of the tension under which the cord C is supplied to the stretching rolls 31 and 32 the knock-off arm 48 is provided. One end of this arm is pivotally secured to a fixed support 49 and the other end is provided with a grooved roller 50 about which the cord passes. The arrangement is such that the weight of this arm will serve to take up slight variations in the tension of the cord as it unwinds from the package 10, and when the tension becomes abnormally slack the arm 48 will drop downwardly to its dotted line position of Fig. 1, or to the position of Fig. 2 in which the pivoted end portion of this arm is shown as having swung downwardly about its pivot point 51. The arm 48 in this case may rest upon the fixed support 52 or may be supported by the connecting link 53 which extends upwardly from the knock-off arm 48 to the drop wire casting 27 and is pivotally secured thereto at 54. This connecting rod serves to hold the casting 27 in its inoperative position so long as the knock-off arm 38 is in its elevated position in which it is shown in full lines in Fig. 1, but causes this casting to move downwardly into the path of the oscillating dog 29 when the arm 48 drops as shown in dotted lines in Fig. 1 or in full lines in Fig. 2, whereupon the apron 22 will be tilted downwardly as above described to stop the winding operation.

The brake 40 serves not only to retard the unwinding of the cord C from the let-off package 10 but also to effect stoppage of the winding operation when it detects substantial exhaustion of the cord upon the let-off spool 10, and to this end the lever 41 is provided with a stop to arrest its pressure upon the bunch 47. This stop in the construction shown comprises a swinging block 55 which is pivotally mounted upon the pivot pin 44 and as this block swings upwardly it strikes against a shoulder on the projection 45. This block is preferably made of hard steel to resist the cutting action of the adjustable bolt 56 carried by the lever 41 and which may be adjusted to accurately determine how close the brake 40 may approach the spool body 46 before its movement is arrested by the stop mechanism just described.

It will be understood from the foregoing that the pressure of the brake 40 upon the let-off package 10 retards the unwinding rotation of this package until all of the cord has been removed therefrom except that contained in the bunch 47, and that when the size of this bunch has been decreased to a predetermined amount the pressure of the brake 40 thereupon will be arrested by the adjustable stop mechanisms 55 and 56. As this pressure of the brake 40 upon the bunch 47 decreases the let-off package will rotate more freely, whereupon the tension of the cord C will be reduced sufficiently to permit the knock-off arm 48 to move downwardly and effect stoppage of the winding operation in the manner above described.

In order that the brake 40 may accurately measure the size of the bunch 47 that remains upon the let-off package before actuating the knock-off mechanism it is important that the spindle 11 shall rotate with a high degree of accuracy in its supporting housing 12. This housing is therefore made relatively long and is provided with the spindle supporting bearings 57 and 58 which are mounted a substantial distance apart therein as shown in Fig. 4.

As above mentioned the present cord stretching and winding machine is designed to be operated at high speed, and it is therefore desirable to provide brake means for arresting the free rotation of the package 10 and its supporting spindle 11 promptly after the knock-off mechanism has been actuated to thereby prevent the supply package from overrunning and cause the cord to tangle. Therefore in the construction shown the casing 12 supports a second brake 59 adapted to cooperate with a brake drum 60 provided upon the spindle 11. This brake 59 is carried at one end of a hollow frame 61 adapted to straddle the casing 12 and which is pivoted to this casing at its opposite sides by the pivot pin 62. The frame 61 is provided at its opposite end with the cross bar 63 and this cross bar is yieldingly connected by the connecting rod 64 to the handle 25 of the rocking apron 22. The lower end of the rod extends slidably through a hole in the cross bar 63 and the upper end is pivotally secured to the handle 25 at 65. There is mounted on the rod 64 a coiled spring 66 which is confined between the cross bar 63 and a stop 67 provided upon the rod 64 and the purpose of this spring is to yieldingly apply the brake 59. Adjustable nuts 68 are provided at the lower end of the rod 64. The operation of this construction is such that when the apron 22 is elevated to the normal winding position of Fig. 1 the brake 59 will be held out of engagement with the brake drum 60 as shown in Figs. 1 and 4, but when the apron 22 is depressed to stop the winding operation, this brake will be applied as shown in Fig. 2.

It will be understood from the construction shown in Fig. 3 that only one of a number of cord stretching and winding units is shown but that the machine may be provided with any desired number of these units. Only a few of the supporting parts of the main frame are shown in the drawings, see for example, the longitudinally extending rails 69 and 70 and the supporting strut 71 for the rotating shaft 38.

The operation of the cord-stretching and winding machine is as follows. The let-off spool or package 10 is placed upon the spindle 11 to rotate therewith. The cord C is then threaded around the pulley 50, and then passes upwardly to the stretching mechanism where it is wound back and forth in a number of runs around the tapered, grooved stretching rolls 31 and 32. It is then led around the auxiliary driving sheave 35 and then under the roller guide 37 and through the guide eye of the compensator 39. From this it passes through the eye of the traverse member 20 and onto the take-up package 15.

After the machine has been threaded up in the manner just described the winding operation may be started by simply grasping the handle 25 to rock the apron 22 upwardly to the position in which it is shown in Fig. 1. In a normal operation the machine should continue to run without being stopped until the brake 40 detects substantial exhaustion of the bunch 47 whereupon the knock-off arm 48 will move downwardly as above described and this through the connecting rod 53 will pull the drop wire casting 27 downwardly into the path of the oscillator dog 29. This will serve to depress the apron 22 and stop the winding operation, and also apply the secondary brake 59. Should breakage of the cord C at any point between the cord stretching device and take-up package 15 occur this will permit the second drop wire casting 28 to drop and thereby stop the winding operation.

Should it be found that an undesirable amount of slippage occurs between the auxiliary driving sheave 35 and the cord C looped thereabout, then it may be desirable to employ the modified construction of Fig. 6 in which a presser roll 72 is provided to press the cord firmly against the sheave 35. This roll 72 is shown as rotatably supported by a rocking lever 73 which is pivotally secured between its ends to the bracket 33 by the pivot 74. At the opposite end of the lever 73 there is rotatably mounted the grooved roll 75. The arrangement is such that the portion of the cord C passing from the sheave 35 to the take-up 15 is bent about the roll 75 as shown to thereby cause the upward pull of the cord on the roll 75 to exert a corresponding downward pressure on the roll 72 to press the cord firmly against the sheave 35 and hold it from slipping.

The arrangement is preferably such that the roll 72 presses only lightly against the sheave when the cord is relaxed, but this pressure increases as the tension upon that portion of the cord looped about the roll 75 increases.

It will be noted that in the modified construction of Fig. 6 the drop wire casting 28 and the coiled wire compensator 39 have been omitted. This has been done as it is found that in most cases the drop wire casting 27 under the control of the knock-off arm 48 may be relied upon to stop the winding operation when the cord either breaks or becomes substantially exhausted.

Having thus described our invention what we claim, and desire to protect by Letters Patent is:

1. In a cord winding machine in combination, a cord take-up package, driving means for winding the cord thereupon, a cord let-off spool having a cord bunch wound thereupon in a predetermined position, a cord stretching device adapted to be operated by the advancing pull exerted on the cord as it passes from the let-off spool to the take-up package, a brake adapted to press against the supply of cord on said spool to retard its rotation during the winding operation and operable to relieve the brake action upon approach of near exhaustion of said bunch, and means for effecting stoppage of the winding of the cord on said take-up package promptly after said brake action is relieved.

2. In a cord winding machine in combination, a cord take-up package, driving means for winding the cord thereupon, a cord let-off spool having a cord bunch wound thereupon in a predetermined position, a cord stretching device adapted to operate on the cord as it passes from the let-off spool to the take-up package, a brake adapted to press against the supply of cord on said spool to retard its rotation during the winding operation and operable to relieve its brake action upon approach of near exhaustion of said bunch, and means for effecting stoppage of the winding of the cord on said take-up package promptly after said brake action is relieved.

3. In a cord winding machine in combination, a cord take-up package, driving means for winding the cord thereupon, a cord let-off spool having a cord bunch wound thereupon in a predetermined position, a cord stretching device adapted to be operated by the advancing pull exerted on the cord as it passes from the let-off spool to the take-up package, a brake adapted to press against the cord on said spool during the winding operation to retard its rotation, a stop for arresting the movement of said brake to thereby relieve its pressure upon the cord of said bunch as the bunch nears exhaustion, and means for effecting stoppage of the winding operation after said brake pressure is relieved.

4. In a cord winding machine in combination, a cord take-up package, driving means for winding the cord thereupon, a cord let-off spool having a cord bunch wound thereupon in a predetermined position, a cord stretching device including rotating means adapted to be operated by the advancing pull upon the cord as it passes from the let-off spool to the take-up package, a brake adapted to press against the supply of cord on said spool during the winding operation to tension the cord drawn therefrom, and an adjustable stop adapted to arrest the brake movement to thereby relieve its pressure upon the cord of said bunch as the latter nears exhaustion, and means for effecting stoppage of the winding operation after said brake pressure is relieved.

5. In a cord winding device in combination, a cord take-up, driving means for winding the cord thereupon, a rotating cord let-off, a cord stretcher including rotating means adapted to be operated by the advancing pull exerted upon the cord as it passes from the let-off to the take-up, a brake adapted to press against the supply of cord on said let-off during the winding operation to tension the cord drawn therefrom, means for relieving the brake pressure on said cord as the cord on the let-off becomes substantially exhausted, means for stopping the winding operation after said brake action is relieved, and a second brake operated by the stopping means to arrest the free running of said let-off.

6. In a cord winding machine in combination, a cord take-up, driving means for winding the cord thereupon, a rotating cord let-off, a cord stretcher including rotating means arranged to stretch the cord as it passes from the let-off to the take-up, knock-off mechanism controlled by the tension of said cord, a brake adapted to press upon the supply of cord on said let-off during the winding operation to tension the cord sufficiently to hold said knock-off inoperative, means arranged to relieve the pressure of said brake upon the cord on the let-off as substantial exhaustion occurs, an actuator under the control of said means for rendering the knock-off active, and mechanism controlled by said knock-off for stopping the winding operation.

7. In a cord winding machine in combination, a cord take-up package, driving means for winding the cord thereupon, a cord let-off spool having a cord bunch wound thereupon in a predetermined position, a cord stretcher including rotating means adapted to be operated by the advancing pull upon said cord and arranged to stretch the cord as it passes from the let-off spool to the take-up package, knock-off mechanism controlled by the tension of said cord, a brake adapted to press against the cord on said spool during the winding operation to retard its rotation and positioned to engage said bunch, means for relieving the pressure of the brake against said bunch as substantial cord exhaustion occurs to thereby render the knock-off active, means controlled by said knock-off to stop the winding operation, and a second brake operated by the stopping means to arrest the rotation of said let-off.

8. In a cord winding machine in combination, a cord take-up package, driving means for winding the cord thereupon, a cord let-off spool, a cord stretcher adapted to be operated by the advancing pull upon the cord and arranged to stretch the cord as it passes from the let-off to the take-up, and means for stopping the winding operation before the cord is entirely exhausted upon said let-off spool, including knock-off mechanism controlled by the tension of said cord, a brake adapted to press against the cord on said spool during the winding operation to retard its rotation, means for relieving the pressure of the brake against said cord as substantial exhaustion occurs to thereby render the knock-off active, and means operable by said knock-off to stop the winding operation.

9. In a cord winding machine in combination, a cord take-up package, driving means for winding the cord thereupon, a cord let-off spool, a cord stretcher adapted to be operated by the advancing pull upon the cord and arranged to stretch the cord as it passes from the let-off to the take-up, and means for stopping the winding operation before the cord is entirely exhausted upon said let-off spool, including knock-off mechanism controlled by the tension of said cord, a brake adapted to press against the cord on said spool during the winding operation to retard its rotation, means for relieving the pressure of the brake against said cord as substantial exhaustion occurs to thereby render the knock-off active, and means controlled by said knock-off to stop the winding operation and also stop the rotation of the let-off spool.

10. In a cord winding machine in combination, a cord take-up package, driving means for winding the cord thereupon, a cord let-off spool having a cord bunch wound thereupon in a predetermined position, a cord stretcher including spaced stretching rolls adapted to be operated by the advancing pull exerted upon the cord as it passes from the let-off spool to the take-up package, a brake adapted to press against the supply of cord on said spool during the winding operation to retard its rotation and operable to relieve its brake action upon approach of near exhaustion of said bunch, and means for effecting the stoppage of the cord winding operation after said brake action is relieved.

11. In a cord winding machine in combination, a cord take-up package, driving means for winding the cord thereupon, a cord let-off spool having a cord bunch wound thereupon, a cord stretcher comprising free running stretching rolls adapted to be operated by the pull exerted on the cord as it passes from the let-off spool to the take-up package, a brake adapted to press against the supply of cord on said spool during the winding operation to retard its rotation, a brake lever for pressing the brake against the cord on said spool and provided with spaced walls for pivotally supporting the lever and for holding the same from lateral vibration, and stop means for arresting the pressure of the brake on said bunch as the size of the latter is reduced a predetermined amount.

12. In a cord winding machine in combination, a cord take-up package, driving means for winding the cord thereupon, a cord let-off spool having a cord bunch wound thereupon, a cord stretcher comprising free running stretching rolls adapted to be operated by the pull exerted on the cord as it passes from the let-off spool to the take-up package, a brake lever pivoted between its ends and provided with a brake at one end and a weight at its other end for applying the brake, said weight being arranged to swing laterally away from the vertical plane of the lever pivot as it moves downwardly from the full spool to the empty spool position to thereby increase the pressure of the brake as the size of the spool decreases, and stop means for arresting the pressure of the brake on said bunch as the cord upon the spool approaches exhaustion.

13. In a cord winding machine in combination, a cord take-up package, driving means for winding the cord thereupon, a cord let-off spool, a cord stretcher adapted to be operated by the advancing pull exerted on the cord as it passes from the let-off spool to the take-up package, a positively driven pull-wheel between the take-up package and the cord stretcher and adapted to frictionally engage the cord and help pull it forward towards the take-up package, a presser roll for pressing the cord against said pull-wheel to reduce the cord slippage, and an operating lever for said roll that is constructed and arranged to be actuated by the tension of said cord to increase the gripping pressure of said roll upon the cord as the cord tension increases.

WILLIAM A. NEWTON, Jr.
DENNIS T. AUSTIN, Jr.